United States Patent Office 3,398,829
Patented Aug. 27, 1968

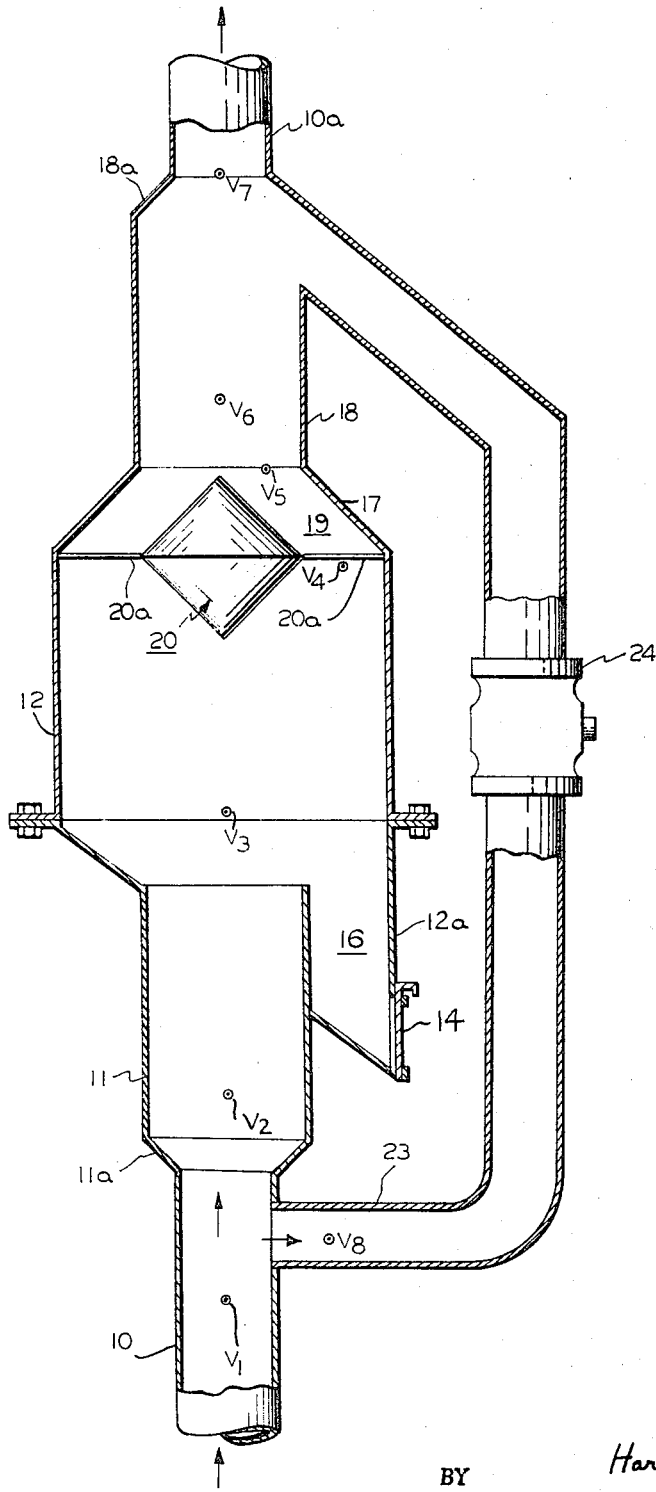

3,398,829
APPARATUS FOR SEPARATING ADULTERANTS DURING PNEUMATIC CONVEYING
George N. Brown, Wilmington, Del., assignor to E. I. du Pont de Nemours and Company, Wilmington, Del., a corporation of Delaware
Continuation-in-part of application Ser. No. 355,395, Mar. 27, 1964. This application Feb. 17, 1967, Ser. No. 616,908
4 Claims. (Cl. 209—3)

ABSTRACT OF THE DISCLOSURE

In a pneumatic conveyor line, a separator having two expansion chambers of predetermined length and cross-sectional area to reduce air velocity in the direction of flow and consume inertial forces of particles being conveyed. The chamber of larger diameter is connected to the downstream end of the conveyor line by a frusto-conical reducer. A double cone member has its upper and lower cones coaxially disposed in the reducer and larger diameter chamber respectively to bar linear travel from the larger diameter chamber to the downstream end of the conveyor line.

*Cross-reference to related applications*

This application is a continuation-in-part of U.S. application Ser. No. 355,395, filed Mar. 27, 1964, now issued Patent 3,312,342.

*Brief summary of the invention*

Generally, this invention relates to the separation of regularly shaped particulate solids of a given density from a mixture with particulate adulterants of greater real and apparent density in the course of pneumatic conveying comprising, in sequence, conveying the mixture substantially vertically upwards in an entraining gas stream, discharging the mixture and entraining gas into a first expansion volume wherein the velocity of the gas is reduced to a level below the minimum floating velocity of the adulterants but above the minimum floating velocity of the regularly shaped particulate solids, thence discharging the mixture and gas into a second expansion volume of greater cross-section than the first expansion volume and of a length preselected to conserve inertial forces acting on the regularly shaped particulate solids sufficiently to carry them through the second expansion volume while dissipating the intertia of the adulterants to an extent substantially precluding their upward transit past the exit level of the second expansion volume, deflecting the gas stream and any entrained solids laterally an amount further reducing the vertical force component of any still-entrained adulterants below the adulterant floating velocity, accelerating the gas stream together with regularly shaped particulate solids entrained therein as exhaust from the second expansion volume and collecting separated adulterants as peripheral fallout within the second expansion volume, together with apparatus for carrying out the method.

*Drawings*

The construction of apparatus according to the invention and the manner in which it operates is detailed in the single figure, which is a partially schematic cross-sectional view of a preferred embodiment of apparatus according to the invention.

*Detailed description*

In the mass production of particulate products it is usually impossible to prevent the occurrence of some adulteration, either in the manufacture itself or in the conveying of raw materials or products to or from the manufacturing process.

Thus, in the manufacture of polyamide resin, which is taken as the particular example chosen to explain this invention, the desired product is a quite regularly shaped rectangle measuring about $\frac{1}{4}''$ x $\frac{3}{16}''$, $\frac{3}{32}''$ thick, formed by knife-scoring followed by breaking a water-chilled sheet of the polymer delivered from a rotating drum. It is convenient to convey the particulate product pneumatically by air entrainment to various more or less remote locations in the plant where it is then either remelted to form extruded products or otherwise processed to more finished form. In the course of such conveying, or even before carrying out the conveying step, the product sometimes becomes accidentally contaminated in various ways, such as by the detachment of metal screw fasteners or other appurtenances from the walls or connections of the pneumatic conveyor line or spillage of containers of substances adjacent to product receptacles, or in other ways, and these adulterants must be completely removed before further manufacturing steps can be safely embarked upon.

In addition, it sometimes happens that the knife scoring of the polymer on the delivery drum is not perfectly accomplished, whereupon occasional polymer slivers, which might typically measure $\frac{1}{4}''$ x $3\frac{1}{2}''$, $\frac{3}{32}''$ thick are mixed with the desired regularly shaped product, and this is objectionable because such slivers sometimes bridge across small openings in the course of further processing, thereby causing blockages shutting down operations. Fortunately, these slivers, as well as aggregates, odd shapes of particles and the like possess diminished buoyant properties different from the entrainment and float characteristics of the identical substance in regularly shaped particulate form, a difference categorized in this description and the claims as "greater apparent density."

The most common adulterants, as hereinbefore described, thus constitute entities of greater real or apparent density than the acceptable regularly shaped particulate material, and it is the objective of this invention to separate these adulterants by selective deposition from the main product entrainment stream. Moreover, it is highly preferred that such purging separation be effected in the course of the regular pneumatic conveying of the product, and by compact apparatus interfering to a minimum with the transport.

Referring to the drawing, there is shown a preferred embodiment of apparatus for interposition in a 4" circular pneumatic conveyor line for the vertical pneumatic transport of $\frac{1}{4}''$ x $\frac{3}{16}''$, $\frac{3}{32}''$ thick regularly shaped particulate polyamide resin product (ave. particle weight about 0.07 gram) at an average rate of 5000–10,000 lbs./hr. The conveyor line is broken at 10 to permit the attachment of the separatory apparatus thereabove, with discharge of purged, entrained regularly shaped particulate material via the continuing run 10a of the conveyor line. The design velocity $V_1$ in line 10 before any separating expansion is, typically, 6000 f.p.m.

It is necessary to conduct the entrainment gas (in this instance air) expansion in two stages in order to obtain complete and dependable separatory action, the first expansion being within coaxial circular duct length 11 (typically 6" dia. x 11" long) joined to the end of line 10 by 1" long, 45° transition piece 11a. The measured gas velocity $V_2$ in the specific separation described was 1900 f.p.m. The exit end of duct 11 then discharges coaxially of the second stage open-ended circular cross-section expansion chamber 12, via its extension 12a the diameter of chamber 12 being typically 12", whereas the straight length is 12". The example measured gas velocity $V_3$ therein was 475 f.p.m.

Expansion chamber 12 is closed off at the lower end with a depending sloped-bottom adulterant reception trap 12a, flange-connected thereto, into which duct 11 discharges at a distance typically 3″ below the lower extremity of chamber 12. The slope of the trap 12a bottom closure is typically about 45°, making the construction self-draining, and its lowermost end is disposed typically 9½″ below the outlet end of duct 11, creating a voluminous reception volume 16 for adulterants expelled by fall-out during the second entrainment gas expansion. Preferably a slide-type trap door 14 is provided to facilitate occasional clean out of trap 12a as circumstances from time to time require.

The upper end of expansion chamber 12 is provided with a coaxial reducer 17, typically 3″ long, discharging into a length (typically 12″) of circular duct 18 (typically 6″ dia.) which, in turn, connects to the 4″ dia. conveyor line continuing run 10a via reducer 18a, in all respects identical with transition piece 11a. Typical exit gas velocities in duct 18 and continuing run 10a for the example described are $V_6 = 1900$ f.p.m. and $V_7 = 6000$ f.p.m., respectively, matching the corresponding gas velocities in the input end of the apparatus. It will be understood that it is practicable to exhaust from the second expansion chamber directly to the continuing run 10a of the conveyor line; however, stagewise acceleration via intermediary duct 18 gives smoother operation with better spacing of the several velocities and is accordingly preferred.

A double-cone flow-confining and directing member, indicated generally at 20, is mounted by radial struts 20a coaxially within chamber 12 at the outlet end thereof, the example construction being back-to-back assembled 90° cones measuring 6″ base diameter, 3″ high, with the upper conical half disposed with outside surfaces evenly separated radially from the inside expanse of reducer 17 to define therewith a 45° inwardly converging annular solids discharge path 19 measuring 3″ radial width, producing an acceleration in the velocity of the entraining gas from $V_4 = 635$ f.p.m. at the inlet adjacent the exit end of chamber 12 to $V_5 = 1900$ f.p.m. at the exit discharging into duct 18.

Preferably, flow-confining and directing member 20 is of a diameter such as to lie across the full straight line prolongation of duct 18 to thereby bar direct linear ingress of the entraining gas and its solids burden. Collision of adulterant particles with member 20, as well as the lateral stream diversion which is required for exhaust therearound out of chamber 12, provides absolute assurance of throw-out of any remaining high energy adulterant particles which may still possess, as a result of multiple collisions and the like, inertial forces continuing them in their upward courses even after full length passages through chamber 12.

Although it is not essential to operation, it is preferred to provide a gas flow regulation by-pass permitting close "tuning" of the entrainment gas velocities within the separator and this is accomplished by employing a 2½″ by-pass line 23 connected in to conveyor line 10 at a sharp angle of about 90° therewith just below its juncture with reducer 11a, and discharging into the exit end of duct 18, conveniently on the same slope, and contiguous with, reducer 18a. The by-pass line is provided with a manually operable air flow regulating valve 24 throttled to maintain a typical air velocity $V_8 = 2900$ f.p.m. at the inlet end of the by-pass line.

The example herein detailed typically involves gas flows of approximately 525 c.f.m. gas supplied via conveyor line 10, divided into two streams of approximately 375 c.f.m. through chamber 12 and 150 c.f.m. through by-pass 23.

In operation, the regularly shaped particulate stock, together with any admixed adulterants, is entrained in the gas stream entering the apparatus via line 10 at a relatively high velocity in the neighborhood of $V_1$, which, as hereinbefore reported for a typical example, might be 6000 f.p.m.

Typical velocity relationships for typical shapes and weights of resin product and adulterants are tabulated as follows:

| Item | Particle shape | Particle weight, in grams | Min. floating velocity, f.p.m. | Min. conveying velocity, f.p.m. |
|---|---|---|---|---|
| Polyamide flake | ¼″ x ³⁄₁₆″ x ³⁄₆₂″ | 0.07 | 1,800 | 2,200 |
| Polyamide sliver | ¼″ x 3½″ x ³⁄₆₂″ | 1.1 | 2,000 | 2,500 |
| Do | ½″ x 2½″ x ³⁄₆₂″ | 1.1 | 2,400 | 2,600 |
| 8-32 brass nut | ¹¹⁄₃₂″ x ³⁄₃₂″ | 1.1 | 2,500 | 2,700 |
| 6-32 steel nut | ⁵⁄₁₆″ x ³⁄₃₂″ | 0.85 | 2,400 | 2,600 |
| ¼″ x 20 brass nut | | 2.7 | 2,900 | 3,200 |
| ½″ steel nut | ¾″ x ¹³⁄₃₂″ | 15.8 | 3,200 | 3,500 |
| ¼″ x 1″ round head bolt | | | 2,800 | 3,100 |
| ³⁄₃₂″ dia. x 2″ copper wire | | | 2,200 | 2,600 |

The force relationship applicable to any entrained particulate solids can be described (refer "Fluidization and Fluid Particle Systems," by Zenz and Othmer, p. 377, publisher Reinhold Publishing Corp. (1960), by the equation:

Inertial force + gravitational force + drag force = 0

Thus, in order to effect a separation of entrained particulate solids of relatively close real or apparent densities it is necessary to vary the several force components applicable to each in such a way that the upward movement of the regularly shaped material desired to be separated as product is continued, whereas adulterant particulate material decelerates to such an extent that it falls out under the action of gravitational force.

The situation is complicated by the fact that numerous inter-particle collisions occur, especially by reason of the considerable turbulence existing within the second expansion chamber 12, 12a which can impart random additional buoyant force components to adulterant particles which tends to restore their upward directional movement and it is, accordingly, essential to employ a final lateral deflection precluding any straight-line advance of adulterants through the separatory apparatus, or there will inevitably be a certain percentage of adulterant carry-over, which cannot be tolerated.

I have found it desirable to effect my expansion of entraining gas in two stages, the first consisting of duct 11, wherein the entraining gas abruptly decelerates to a velocity $V_2$ (typically, 1900 f.p.m.) which is below the minimum floating velocity of the contaminating adulterants but somewhat above that of the regularly shaped product to be separated as a carried-through fraction.

This is immediately followed by a second expansion within chamber 12, 12a to an entraining gas velocity of $V_3$ (typically, 475 f.p.m.), i.e., well below the floating velocity of both regularly shaped particles and adulterants. The diameter and length of chamber 12, 12a must be carefully preselected in order to preferentially dissipate the upward inertial forces acting on adulterant particles, while conserving these same forces applicable to the regularly shaped product, in order to continue its upward progress. Fortunately, the radial enlargement of chamber 12, 12a over duct 11 need only be by a factor of approximately 2, whereas the length (ignoring the relatively short longitudinal extension contributed by trap 12a) need only be slightly greater than that of duct 11, which permits the absolutely essential compactness required for interposition of the apparatus in both existing and new pneumatic conveying systems.

In operation, the great majority of tramp metal as well as most of the irregularly shaped particles, such as slivers, aggregates and the like, are immediately thrown out peripherally within expansion chamber 12, 12a by the turbulence existing therein, whereupon they collect in reception volume 16 of trap 12a. In addition, a small quantity of the regularly shaped product particles also deposits here; however, the denser adulterants displace this material and it eventually spills over into the discharge opening of duct 11, to thereupon become immediately re-entrained in the main conveying gas stream. This capability of restorative re-entrainment of regularly shaped particulate product is a very desirable feature of the two-stage expansion system of this invention.

A very small percentage of adulterant material might, by virtue of exceptional inertia achieved by inter-particle collision, travel as high as the depending bottom of double cone member 20, where the particles impinge and are deflected downwardly and outwardly as peripheral fallout, again depositing within trap 12a. Any adulterant particles which might deflect in a lateral sense lose enough of their vertical velocity components to preclude further vertical travel, whereupon they too fall away peripherally. On the other hand, the great majority of the lighter, regularly shaped particles reach the height of cone member 20 retaining enough inertial vertical velocity in relationship to their masses to survive the lateral deflection and arrive in the close vicinity of the inlet side of annular discharge path 19. Here the somewhat higher sweep velocity $V_4$ (typically 635 f.p.m.) immediately draws the product material through passageway 19 and thence through duct 18, discharging into the continuing conveyor line run 10a transporting the product to process equipment downstream, not shown.

It is practicable to adjust adulterant purging operations quite precisely for different rates of product throughput and specific process particle shapes and sizes, as well as various types of adulterants, by opening or closing valve 24 to, respectively, increase or decrease by-pass flow around the separator apparatus. Due to the 90° offset entrance of by-pass line 23, solids conveyed through line 10 clear the opening of the by-pass line and the action here is primarily a gas static pressure letdown, so that no difficulties are encountered from solids ingress or deposition within the by-pass line.

The apparatus design hereinabove detailed has the advantage of extremely low pressure drop (typically less than 1" $H_2O$) coupled with economy of first cost and maintenance and great compactness, rendering it easily installed in pneumatic conveying circuits in even relatively congested plant locations. Moreover, it is adapted to handle a very wide variety of different products, so that it has widespread, almost automatic use potential in industries, such as food manufacture and the like, wherein there is an absolute prohibition against adulteration as well as where a highly standardized product shape and weight is desirable.

It will be understood that this invention can be modified in numerous respects without departure from its essential spirit, and it is therefore intended to be limited only within the scope of the appended claims.

What is claimed is:

1. Apparatus for in-line separation of particulate adulterants of greater real and apparent density from regularly shaped particulate solids during the upward pneumatic conveying of a mixture thereof in an entraining gas through a substantially vertically disposed circular cross-section pneumatic conveyor line comprising, in combination in open communication and in serial connection one with another in the direction of said pneumatic conveying, a first coaxial circular cross-section expansion chamber of configuration wherein the velocity of said entraining gas is reduced to a level below the minimum floating velocity of said adulterants but above the minimum floating velocity of said regularly shaped particulate solids, a second coaxial circular cross-section expansion chamber of greater diameter than said first expansion chamber and of a length preselected to conserve inerial forces acting on said regularly shaped particulate solids sufficiently to carry them through said second expansion chamber while dissipating the inertia of said adulterants to an extent substantially precluding their upward transit past the exit level of said second expansion chamber, an adulterant reception trap fixed to the lower end of said second expansion chamber with terminal base portion depending below the connection of said first expansion chamber with said second expansion chamber, a frusto-conical reducer connecting the upper discharge end of said second expansion chamber coaxially with the continuing run of said conveyor line, and a double-cone flow-confining and directing member mounted coaxially within said second expansion chamber with uppermost conical half-section disposed centrally of said reducer to define therewith a substantially uniform annular cross-section flow-acceleration passage for said regularly shaped particulate solids leading from said second expansion chamber into said continuing run of said conveyor line.

2. Apparatus for in-line separation of particulate adulterants of greater real and apparent density from regularly shaped particulate solids during the upward pneumatic conveying of a mixture thereof in an entraining gas according to claim 1 wherein said double-cone flow-confining and directing member has a diameter substantially equal to the small diameter opening of said frusto-conical reducer.

3. Apparatus for in-line separation of particulate adulterants of greater rear and apparent density from regularly shaped particulate solids during the upward pneumatic conveying of a mixture thereof in an entraining gas according to claim 1 wherein there is interposed in flow circuit between the exit end of said reducer and said continuing run of said conveyor line a third expansion chamber of configuration substantially identical with that of said first expansion chamber attached at its upper end via a frusto-conical reducer connection with said continuing run of said conveyor line.

4. Apparatus for in-line separation of particulate adulterants of greater real and apparent density from regularly shaped particulate solids during the upward pneumatic conveying of a mixture thereof in an entraining gas according to claim 1 wherein there is provided a by-pass line including a gas-flow throttling valve connected in open communication with said pneumatic conveyor line at a sharp angle therewith and in shunt circuit around said first expansion chamber and said second expansion chamber.

References Cited

UNITED STATES PATENTS

| | | |
|---|---|---|
| 2,931,501 | 4/1960 | Wahlroos _____ 209—160 |
| 3,312,342 | 4/1967 | Brown _____ 209—3 |
| 2,386,975 | 10/1945 | Pearce. |
| 2,389,701 | 11/1945 | Truesdale. |
| 2,620,841 | 12/1952 | Jacobson. |
| 2,683,685 | 7/1954 | Matheson. |
| 2,696,910 | 12/1954 | Ljungdell. |
| 2,715,461 | 8/1955 | Maulsby. |
| 2,779,719 | 1/1957 | Spitz. |
| 3,015,390 | 1/1962 | Stewart. |
| 3,269,189 | 8/1966 | Monk. |

FOREIGN PATENTS

| | | |
|---|---|---|
| 903,570 | 1/1945 | France. |
| 229,291 | 12/1910 | Germany. |
| 485,868 | 11/1929 | Germany. |

FRANK W. LUTTER, Primary Examiner.